Figure 1:
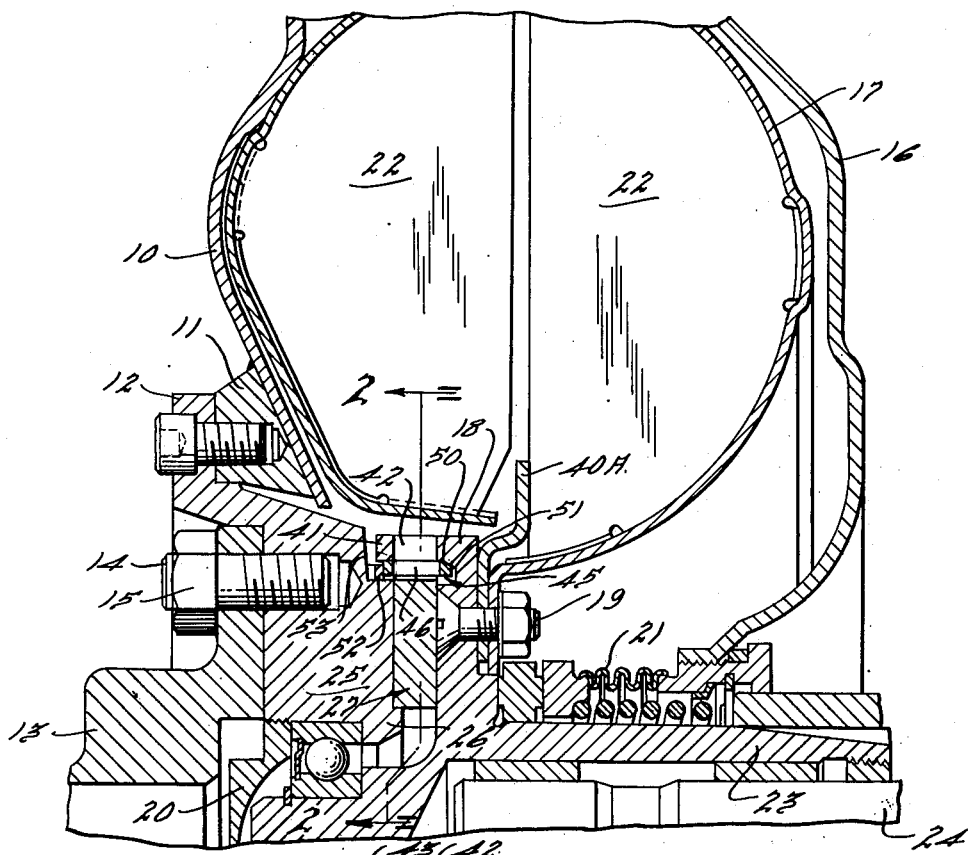

Oct. 14, 1952     E. R. MAURER     2,613,782
SYNCHRONIZED CENTRIFUGAL CLUTCH
Original Filed Feb. 19, 1945

INVENTOR.
Edwin R. Maurer.
BY
Harness & Harris
ATTORNEYS.

Patented Oct. 14, 1952

2,613,782

UNITED STATES PATENT OFFICE 2,613,782

SYNCHRONIZED CENTRIFUGAL CLUTCH

Edwin R. Maurer, Detroit, Mich., assignor to Chrysler Corporation, Highland Park, Mich., a corporation of Delaware Original application February 19, 1945, Serial No. 578,631. Divided and this application July 24, 1948, Serial No. 40,567

13 Claims. (Cl. 192—105)

This invention relates to power transmitting drives providing a pawl clutch of the centrifugal type engageable to drivingly connect a driving and a driven member. More particularly my invention has reference to centrifugal pawl clutch mechanism providing means for controlling the pawl engagement, for example, whereby it may be made operably responsive to certain predetermined conditions of operation of the drive structure with which the clutch mechanism is associated. The present application is a division of my copending application Serial No. 578,631 filed February 19, 1945, now Patent No. 2,448,539.

My invention will be illustrated as applied to a centrifugally actuated pawl clutch mechanism for locking together against slip under certain conditions of vehicle operation a pair of fluid power transmitting elements, which clutch mechanism includes a driving member drivingly associated with one of said power transmitting elements, a driven member drivingly associated with the other of the power transmitting elements, a locking pawl carried by one of the members and operably responsive to centrifugal force upon predetermined rotation of said one member for interconnecting said clutch elements and means for preventing the operation of the clutch mechanism for positively locking together the fluid power transmitting elements until the rotative speeds of the clutch members have been first brought to approximate synchronism.

An object of the invention therefore, is to provide an automatically operable clutch mechanism with means operable in response to functioning of the power transmitting drive structure in which the clutch mechanism is incorporated for controlling engagement of the clutch mechanism.

Another object is to provide a centrifugal type pawl clutch mechanism for an automotive vehicle drive structure with blocker means operable automatically under certain conditions of vehicle functioning for positively preventing engagement of the pawl.

A more particular object is the provision of control means aforesaid in the nature of a frictionally driven balk ring interposed between the pawls and pawl receiving recesses and having circumferential slots through which the centrifugal pawl may be projected into engagement to lock up the clutch mechanism and which ring is constantly maintained by resilient means in frictional contact with one of the driving or driven members.

Figure 2:
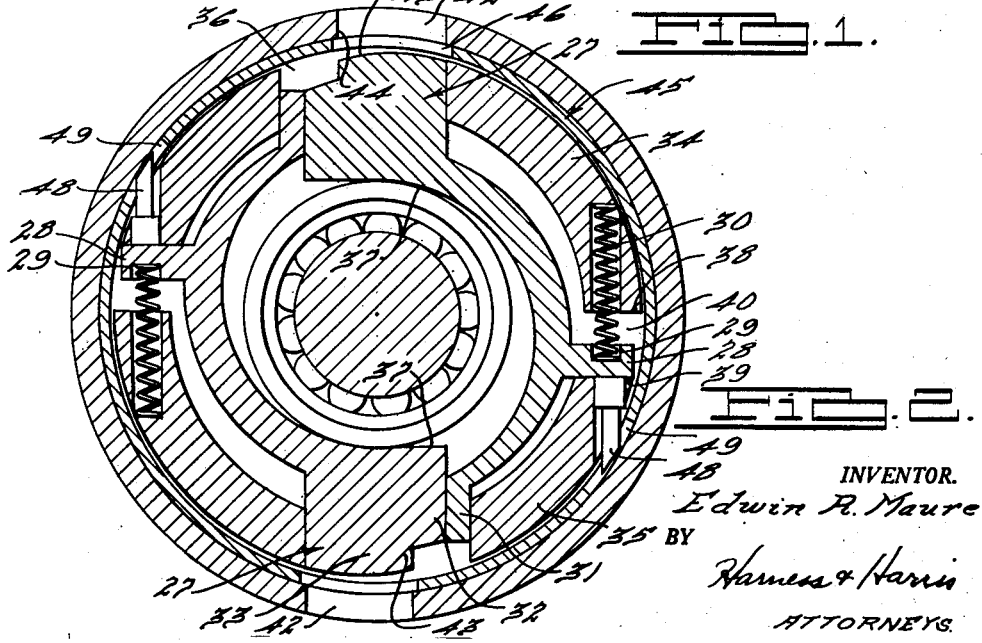

Other objects of my invention will be apparent from the following description and the drawing wherein:

Fig. 1 is a sectional view in elevation of a portion of a transmission embodying the present invention; and Fig. 2 is a sectional view taken along the line 2—2 of Fig. 1.

Referring to Figs. 1 and 2, it will be seen that there is illustrated a fluid power transmitting device such as a fluid coupling having an impeller 10 provided with an annular ring 11 by which it is carried on a hub 12 which is fastened to an engine crankshaft 13 by means of studs 14 and nuts 15. The impeller includes a housing portion 16 which encloses a runner 17, the latter being welded to a hub 18 or fastened thereto by bolts 19. A forward seal 20 and a rearward seal 21 prevent leakage of fluid which is circulated in the passages formed by the vanes 22, as is common in the art. The runner hub 18 has a tubular driven portion 23 by which drive is imparted to the input member of the vehicle transmission. This tubular portion, as shown, pilots a transmission shaft 24. The impeller hub 12 also serves as the pawl drive member of a centrifugal clutch, it having a rearward pawl carrying core portion 25 formed with a shoulder 26 and which is slotted to carry a pair of pawls 27. The pawls are movable radially outwardly in response to centrifugal force acting upon the pawls during rotation of the impeller hub 12. The pawls 27 are an element of the centrifugal clutch and have ears 28 provided with recesses 29 for receiving a coil compression spring 30 of predetermined force value which tends to keep the pawls in retracted, that is, disengaged position.

The pawls are shaped as illustrated in Fig. 2. Each has an integral tail portion 31 which lies alongside a portion 32 of the head 33 of the pawl and acts as a dragging connection between the pawl and the hub 12 as well as a guide to keep the pawls in position. The pawl carrying core 25 is provided with rearwardly projecting annular segments 34, 35 which serve as guideways for the head 33 and tail 31 of the pawls and further provide a driving connection between the hub 12 and the pawls.

The pawls loosely embrace the core 25 and have sufficient clearance in the slotted guideways 36 such that they may move radially outwardly under the influence of centrifugal force or be retracted by the springs 30. This movement is limited in both directions by engagement of the inner surface 37 of the pawls with the shoulder 26 of the pawl core 25 or by abutment of the pawl ears 28 with the adjacent faces 38, 39 of the annular segments 34, 35 respectively, which form a slot 40 for reception of the ears 28. These segments 34 and 35, as previously indicated, provide a slotted guideway 36 for the pawl head and tail portions.

The springs 30 may be of any desired strength to produce the operating characteristics desired, it being understood that the springs will keep the pawls in the illustrated retracted position until a predetermined speed of the drive hub 12 is reached whereupon centrifugal force will overcome the force of the springs 30 and the pawls will tend to move radially outwardly as explained below.

The runner hub 18 carries a baffle 40ᴬ for reducing the efficiency of the coupling at idling speed and for preventing surges and is formed with a forwardly projecting annular portion 41 constituting the driven member of the centrifugal clutch. The portion 41 is provided with circumferentially spaced notches or pawl receiving openings 42. Two openings 42 are shown but more may be required in some installations.

The openings 42 are shown radially aligned with the pawls 27 such that the pawls may if outwardly projected by centrifugal force engage the openings 42 to positively lock the impeller hub 12 in drive with the runner hub 18. The pawls 27 are formed with an outer cammed surface 43 which is shaped such that when the pawls are urged outwardly by centrifugal force if the annular portion 41 of the runner hub 18 rotatably lags behind the impeller hub 12 the surface 43 will engage the edge 44 of the openings 42 and cam the pawls inwardly until the speeds of the two members are again substantially synchronized, whereupon the pawls will enter the openings 42.

In operation of the device so far described, let it be assumed that the parts are in the position illustrated with the vehicle engine, hubs 12 and 18 and the shafts 23 and 24 at rest. The engine may be started in the normal manner and the vehicle may then be accelerated, maneuvered, etc., with the coupling elements slipping. When the vehicle has been accelerated to a predetermined cruising speed, for example, 25 M. P. H. the pawls 27 under the influence of centrifugal force, tend to move outwardly to engage the openings 42. They will be prevented from engaging the openings, however, so long as the rotative speeds of the pawls and the hub 18 are different as they normally will be because of the slipping between the impeller and runner of the coupling. The driver can effect engagement of the pawls momentarily releasing the engine throttle whereupon the impeller will drop in speed relative to the runner and the pawls will engage at the instant of synchronism between these members.

Unless some means be provided for positively blocking or locking up the pawls under a synchronous conditions the pawls will ratchet past the pawl units or openings 42 to produce a noisy operation and wear and under certain conditions even breakage of the pawls.

To positively block movement of the pawls into engagement under asynchronous conditions of operation I have provided, as shown, a balking or blocking ring in the nature of a continuous circumferential band 45 having circumferentially spaced openings 46 extending therethrough which, as shown in Fig. 2, are aligned with the clutching ends 43 of head portions 33 of the pawls 27 and which, as shown, are of greater circumferential extent than the clutching ends 43. This band 45 is preferably carried in frictional engagement with the inner periphery of the annular portion 41 of the hub 18 or frictionally engaged therewith as hereinafter described. Projections in the form of pins 48 rigidly carried by the portions 35 of the pawl carrying core 25 are received in openings or clocking slots 49 in the ring 45. These slots 49 are of sufficient circumferential length to permit limited relative movement between the pins 48 and the ring 45 to the extent permitted by the slots 49 from the neutral position illustrated in Fig. 2. It will be evident that when the pins 48 are at either end of the slots 49, the pawl receiving openings 46 of the rings 45 are misaligned radially speaking, relative to the pawls 27 such that portions of the ring 45 overlap the ends 43 of the pawls and hence block movement of the pawls past the ring 45.

Thus, for example, as the band 45 is moved in a clockwise or counterclockwise direction by frictional drag of the annular portion 41 of the runner hub 18 the pins limit the relative movement of the band 45 and the pawl carrying cage or core 25. The frictional engagement referred to is constantly present by reason of a tapered rearward face 50 on the ring 45 which is biased into constant frictional engagement with a complementary tapered surface 51 on the interior surface of the annular portion 41 of the hub 18 by a finger spring 52 which bears against the opposite end of the ring 45 and a shoulder 53 of the pawl carrying core 25. Once the pins limit the relative movement of the band and pawl carrying core the annular portion 41 of the hub 18 slips thereafter relative to the ring 45.

Similarly if the pawl carrying core 25 is moved in either direction relative to the runner 17 and the annular portion 41, the pins 48 will move to either end of the slots 49 of the ring 45 and thereafter the ring will continue to move with the pawl carrying core. In either described case, misalignment of the openings 46 of the ring 45 with the pawls 27 results, thus preventing the latter from entering the openings 42 of the annular portion 41 of the runner hub 18.

Under drive conditions, after the vehicle has been accelerated to a predetermined speed, if the accelerator is momentarily released, the impeller will be decelerated and become synchronized with the runner which will then try to overrun the impeller. At this moment the frictional drag between the ring 45 and the annular portion 41 will effect relative movement of the ring relative to the pins 48 to permit the openings 42 of the ring to become aligned with the pawls 27 such that the latter may pass through these openings 46. This outward movement of the pawls 27 is facilitated by the adequate length of the slots 46 and the entry of the high portion of the pawl into the slots. Thereafter, as soon as a slot 42 of the clutch annular portion of the hub 18 is aligned with a pawl 27, the latter will be projected into engagement with the openings 42 by the action of centrifugal force, thereby establishing a positive lockup between the impeller and runner.

Under coast conditions of vehicle operation as when the runner is rotating forwardly at greater speed than the impeller, the ring 45 will be driven by the frictional engagement with the hub member 18 until the lost motion between the slots 49 and pins 48 is taken up whereupon further forward rotation of the ring 45 with the hub 18 will cease and the ring 45 will rotatably lag behind the runner. If the accelerator is thereupon depressed to speed up the rotative velocity of the impeller to effect synchronism with the runner, the pins will first move away from the ends of the slots 49 and the pawls 27 will attempt to engage with the openings 46 of the ring 45 as the pawl carrying core 25 and runner hub 18 pass through synchronism. As soon as this occurs the pawls will then be further projected by centrifugal force into engagement with the pawl openings 42 of the runner hub portion 41 thereby forming a positive lockup between the impeller and runner. Should for some reason the pawls 27 not pass through the openings 46, the pins 48 will move to the other ends of the slots 49 again blocking the pawls from engagement which may thereafter be engaged upon momentary release of the accelerator in the manner described above.

The impeller and runner following engagement of the pawls will remain locked for joint operation without slippage so long as the impeller tends to overrun the runner as would be the case during normal driving of the vehicle by the engine or as long as the runner tends to overrun the impeller as under coast conditions described above. When the pawl carrying core has its speed reduced below the engaging speed of the pawls as when the vehicle is brought to a stop, the pawls will under urging by the springs 30 become disengaged from the pawl receiving openings 42. Should thereafter the relative speeds of the pawl carrying core 25 and the hub 18 become asynchronous the ring 45 will again be moved into blocking relationship with respect to the pawls 27.

From the foregoing description of my invention it will be understood that I have provided a simple and desirable control construction for retaining the pawls of a centrifugal clutch in a predetermined position until certain vehicle operating conditions have been reached in response to which such control means may release the pawls for engagement.

While the particular structures herein described are well adapted for carrying out the objects of my invention it will be understood that various modifications, changes, and substitutions may be made without departing from the spirit thereof, for example, various changes in the size, shape, and arrangement of the parts may be made by those skilled in the art. The present invention is therefore, to be construed to include all such modifications, changes, and substitutions.

I claim:

1. A power transmitting clutch mechanism comprising a rotatable driving member, a coaxial driven member, a centrifugally responsive pawl carried by one of said members and interengageable with the other of said members at a predetermined rotative speed of said one member and substantially synchronous rotation of said members, a ring having a cylindrical outer wall in alignment with said pawl transversely of the member axis, said wall having a slot through which the pawl may be projected and having a portion adjacent the opposite circumferential ends of said slot for blocking engagement of said pawl during asynchronous rotation of said members and spring means for biasing said ring into frictional drive connection with said other member.

2. A power transmitting clutch mechanism comprising a rotatable driving member, a coaxial driven member, a centrifugally responsive pawl carried by one of said members and interengageable with the other of said members at a predetermined rotative speed of said one member and substantially synchronous rotation of said members, and a ring in alignment with said pawl transversely of the member axis for blocking engagement of said pawl during asynchronous rotation of said members, said ring having an opening therein for permitting passage through of said pawl for effecting engagement thereof and having circumferential portions at the opposite ends of said opening for providing said blocking engagement.

3. A power transmitting clutch mechanism comprising a rotatable driving member, a coaxial driven member, a centrifugally responsive pawl carried by one of said members and interengageable with the other of said members at a predetermined rotative speed of said one member and substantially synchronous rotation of said members, a ring in alignment with said pawl transversely of the member axis for blocking engagement of said pawl during asynchronous rotation of said members, said ring having an opening therein for permitting passage through of said pawl for effecting engagement thereof and having portions at each end thereof for providing said blocking engagement, and spring means for biasing said ring into frictional drive connection with said other member.

4. A power transmitting clutch mechanism comprising a rotatable driving member, a coaxial driven member, a centrifugally responsive pawl carried by one of said members, an annular portion on said other member having an opening therein for receiving said pawl at predetermined speed of said one member and substantially synchronous rotation of said members whereby to positively connect said members in drive, and a ring in alignment with said pawl transversely of the member axis and having spaced portions for interposition between the engaging end of said pawl and said annular portion to block engagement of said pawl with said opening during asynchronous rotation of said members, said ring having an end portion thereof in frictional drive connection with said other member and having a recess therein between said spaced portions for permitting passage therethrough of the pawl when effecting engagement thereof with said opening.

5. A power transmitting clutch mechanism comprising a rotatable driving member, a rotatable driven member, a centrifugally responsive pawl carried by one of said members, an annular portion on said other member having an opening therein for receiving said pawl at predetermined speed of said one member and substantially synchronous rotation of said members whereby to positively connect said members in drive, and means for blocking engagement of said pawl in said opening during asynchronous rotation of said members comprising a ring internally of said annular portion, said ring having a recess therein in the plane of said pawl receiving opening permitting passage therethrough of said pawl when effecting engagement with said opening, portions at the ends of said recess for blocking pawl engagement and an end face for frictional engagement with a face on said other member to establish a frictional drive between said ring and other member and there being resilient means directly acting on said ring biasing said faces into engagement.

6. A power transmitting clutch mechanism comprising a rotatable driving member, a coaxial rotatable driven member, a centrifugally responsive pawl carried by one of said members, an annular portion on said other member having an opening therein for receiving said pawl at predetermined speed of said one member and substantially synchronous rotation of said members whereby to positively connect said members in drive, and means for blocking engagement of said pawl during asynchronous rotation of said members comprising an integral ring having circumferential portions for blocking engagement of a pawl, a recess between said portions for permitting passage of the pawl and a tapered surface in the same circumferential plane as said blocking portions engageable with a complementary tapered surface on said other member, and a spring for effecting frictional driving engagement between said surfaces.

7. A power transmitting clutch mechanism comprising a rotatable driving member, a coaxial rotatable driven member, a centrifugally responsive pawl carried by one of said members, an annular portion on said other member having an opening therein for receiving said pawl at predetermined speed of said one member and substantially synchronous rotation of said members whereby to positively connect said members in drive, and means for blocking engagement of said pawl during asynchronous rotation of said members comprising an integral ring carried internally of said annular portion and having a tapered surface engageable with a complementary tapered surface on said other member, and having a recess in the plane of said pawl receiving opening for permitting passage therethrough of said pawl when effecting engagement in said opening and having a blocking portion at each end of said recess for blocking engagement of the pawl and a spring for biasing said tapered surfaces into engagement for effecting a frictional drive connection between said ring and other member.

8. A power transmitting clutch mechanism comprising a rotatable driving member, a coaxial rotatable driven member, a centrifugally responsive pawl carried by one of said members, an annular portion on said other member having an opening therein for receiving said pawl at predetermined speed of said one member and substantially synchronous rotation of said members whereby to positively connect said members in drive, and means for blocking engagement of said pawl during asynchronous rotation of said members comprising an integral ring carried internally of said annular portion and having a tapered surface engageable with a complementary tapered surface on said other member, and having a recess in the plane of said pawl receiving opening for permitting passage therethrough of said pawl when effecting engagement in said opening and having a pawl blocking portion at each end of said recess, a spring for biasing said tapered surfaces into engagement for effecting a frictional drive connection between said ring and other member, and means on said ring and said one member providing a positive limited lost motion connection between said ring and said one member.

9. A power transmitting clutch mechanism as claimed in claim 8 wherein said lost motion connection comprises a circumferential slot on said ring and a pin on said one member.

10. A power transmitting clutch mechanism comprising a rotatable pawl carrying core, a radially movable centrifugally responsive pawl carried by said core, a rotatable shell having an opening therein for receiving said pawl to effect a positive drive connection between said core and shell, an integral pawl blocker ring interposed radially between said core and shell, a circumferential recess in said ring for permitting passage therethrough of said pawl when effecting engagement with said shell, blocker portions at the circumferential ends of said recess for blocking pawl engagement, a spring between said ring and core for effecting a frictional drive connection between said ring and shell, and a lost motion driving connection between said ring and core comprising a pin on one thereof and a slot on the other receiving said pin.

11. A power transmitting clutch mechanism, comprising a rotatable pawl carrying core, a radially movable centrifugally responsive pawl carried by said core, a rotatable shell having an opening therein for receiving said pawl to effect a positive drive connection between said core and shell, an integral pawl blocker ring having a circumferential blocker portion and a circumferential tapered surface in the same general circumferential plane as the blocker portion engageable with a complementary tapered surface on said shell, spring means acting directly on said ring for biasing said surfaces into engagement for effecting a frictional drive connection between said ring and shell and means on said ring for limiting relative rotation between said ring and pawl.

12. A power transmitting clutch mechanism comprising a rotatable pawl carrying core, a radially movable centrifugally responsive pawl carried by said core, a rotatable shell having an opening therein for receiving said pawl to effect a positive drive connection between said core and shell, an integral pawl blocker ring having a circumferential blocker portion and a circumferential tapered surface endwise of the blocker portion engageable with a complementary tapered surface on said shell, spring means acting directly on said ring for biasing said surfaces into engagement for effecting a frictional drive connection between said ring and shell and means providing a limited lost motion connection between said ring and core.

13. A power transmitting clutch mechanism comprising a driving member, a coaxial driven member, a centrifugally responsive pawl carried by one of said members and interengageable with the other of said members at predetermined speed of said one member and synchronous rotation of said members for positively connecting said members in drive, a pawl blocker element intermediate said members transversely of the axis of said members, said blocker element having a portion thereof in frictional drive connection with said other member and having a cylindrical portion in a positive lost motion driving connection with said pawl, and said cylindrical portion having a recess therein for permitting passage therethrough of said pawl and having a portion at each circumferential end of said recess for positioning over the end of said pawl to block engagement thereof under asynchronous operation of said members.

EDWIN R. MAURER.

REFERENCES CITED

The following references are of record in the file of this patent:

UNITED STATES PATENTS

| Number | Name | Date |
| --- | --- | --- |
| 2,194,787 | Dunn | Mar. 26, 1940 |
| 2,278,623 | Orr | Apr. 7, 1942 |
| 2,448,539 | Maurer | Sept. 7, 1948 |